United States Patent
Kurani et al.

(10) Patent No.: US 9,652,770 B1
(45) Date of Patent: May 16, 2017

(54) MOBILE WALLET USING TOKENIZED CARD SYSTEMS AND METHODS

(71) Applicant: Wells Fargo Bank, N.A., San Francisco, CA (US)

(72) Inventors: Ashish Bhoopen Kurani, Burlingame, CA (US); Nikolai Stroke, Gilbert, CA (US); Bipin Sahni, Pleasanton, CA (US); Stephen M. Ellis, San Francisco, CA (US); Steve Puffer, Champlin, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 14/266,580

(22) Filed: Apr. 30, 2014

(51) Int. Cl.
*G06Q 20/38* (2012.01)
*G06Q 20/36* (2012.01)

(52) U.S. Cl.
CPC ........... *G06Q 20/385* (2013.01); *G06Q 20/36* (2013.01)

(58) Field of Classification Search
CPC .... G06F 17/60; G06Q 20/3829; G06Q 99/00; G06K 5/00
USPC ................................ 705/39, 64, 16; 235/380
See application file for complete search history.

(56) References Cited

U.S. PATENT DOCUMENTS

| | | | |
|---|---|---|---|
| 5,412,192 | A | 5/1995 | Hoss |
| 6,865,547 | B1 | 3/2005 | Brake et al. |
| 7,930,225 | B2 | 4/2011 | Wahlberg et al. |
| 7,970,669 | B1 | 6/2011 | Santos |
| 8,126,806 | B1 | 2/2012 | Dimartino et al. |
| 8,215,560 | B2 | 7/2012 | Granucci et al. |
| 8,433,657 | B2 | 4/2013 | Dinan |
| 8,452,257 | B2 | 5/2013 | Granucci et al. |
| 8,467,766 | B2 | 6/2013 | Rackley et al. |
| 8,468,587 | B2 | 6/2013 | Blinn et al. |
| 8,489,067 | B2 | 7/2013 | Rackley, III et al. |
| 8,504,699 | B2 | 8/2013 | Vaughan et al. |
| 8,538,845 | B2 | 9/2013 | Liberty |
| 8,555,361 | B2 | 10/2013 | Nakhjiri et al. |
| 8,615,468 | B2 | 12/2013 | Varadarajan |
| 8,627,424 | B1 | 1/2014 | O'Malley et al. |
| 8,639,621 | B1 | 1/2014 | Ellis et al. |
| 8,645,971 | B2 | 2/2014 | Carlson et al. |

(Continued)

FOREIGN PATENT DOCUMENTS

| | | |
|---|---|---|
| WO | WO-2011/113121 A1 | 9/2011 |
| WO | WO-2013/079793 A1 | 6/2013 |

(Continued)

OTHER PUBLICATIONS

Non-Final Office Action for U.S. Appl. No. 14/471,920 dated Mar. 14, 2016. 16 pages.

(Continued)

*Primary Examiner* — Calvin L Hewitt, II
*Assistant Examiner* — Nakia Leffall-Allen
(74) *Attorney, Agent, or Firm* — Foley & Lardner LLP (57) ABSTRACT

One embodiment of the present disclosure relates to a computer-implemented method that includes sending, by a mobile wallet server, an identification number that is part of a substitute card number to be used by a mobile device as a mobile wallet, determining an actual card number based on the substitute card number and sending the actual card number and the identification number for processing a payment.

7 Claims, 8 Drawing Sheets

(56) References Cited

U.S. PATENT DOCUMENTS

| | | | |
|---|---|---|---|
| 8,706,628 B2 | 4/2014 | Phillips | |
| 8,725,577 B2 | 5/2014 | Fisher | |
| 8,768,834 B2 | 7/2014 | Zacarias et al. | |
| 8,774,781 B1 | 7/2014 | Speiser et al. | |
| 8,781,955 B2 | 7/2014 | Schamer et al. | |
| 8,831,677 B2 | 9/2014 | Villa-Real | |
| 8,843,125 B2 | 9/2014 | Kwon et al. | |
| 8,843,417 B2 * | 9/2014 | Hammad | G06Q 20/085 705/44 |
| 8,880,432 B2 | 11/2014 | Collins, Jr. | |
| 8,972,297 B2 | 3/2015 | Kay et al. | |
| 8,989,712 B2 | 3/2015 | Wentker et al. | |
| 9,020,836 B2 | 4/2015 | Fisher et al. | |
| 9,026,460 B2 | 5/2015 | Grigg et al. | |
| 9,027,109 B2 | 5/2015 | Wolberg-Stok et al. | |
| 9,043,240 B2 | 5/2015 | Langus et al. | |
| 9,098,190 B2 | 8/2015 | Zhou et al. | |
| 9,177,307 B2 | 11/2015 | Ross et al. | |
| 9,208,488 B2 | 12/2015 | Liberty | |
| 9,218,624 B2 | 12/2015 | Moghadam | |
| 9,256,876 B2 | 2/2016 | Vasant Akole et al. | |
| 9,286,606 B2 | 3/2016 | Diamond | |
| 9,324,068 B2 | 4/2016 | Soundararajan | |
| 9,361,616 B2 | 6/2016 | Zhou et al. | |
| 2003/0028481 A1 * | 2/2003 | Flitcroft | G06Q 20/00 705/39 |
| 2005/0043997 A1 * | 2/2005 | Sahota | G06Q 20/10 705/16 |
| 2005/0184145 A1 * | 8/2005 | Law et al. | 235/380 |
| 2006/0253335 A1 * | 11/2006 | Keena et al. | 705/26 |
| 2007/0244811 A1 * | 10/2007 | Tumminaro | 705/39 |
| 2008/0006685 A1 | 1/2008 | Rackley, III et al. | |
| 2008/0208742 A1 | 8/2008 | Arthur | |
| 2009/0048971 A1 * | 2/2009 | Hathaway | G06Q 20/105 705/41 |
| 2010/0114731 A1 | 5/2010 | Kingston et al. | |
| 2010/0191602 A1 | 7/2010 | Mikkelsen et al. | |
| 2011/0191160 A1 | 8/2011 | Blackhurst et al. | |
| 2011/0196782 A1 | 8/2011 | Allen et al. | |
| 2011/0295748 A1 | 12/2011 | Woodriffe | |
| 2012/0018511 A1 * | 1/2012 | Hammad | G06Q 20/12 235/380 |
| 2012/0078735 A1 | 3/2012 | Bauer et al. | |
| 2012/0110634 A1 | 5/2012 | Jakobsson | |
| 2012/0310774 A1 | 12/2012 | Chassin | |
| 2012/0323762 A1 | 12/2012 | Kapur et al. | |
| 2013/0042261 A1 | 2/2013 | Tavormina et al. | |
| 2013/0191227 A1 | 7/2013 | Pasa et al. | |
| 2013/0204785 A1 | 8/2013 | Monk et al. | |
| 2013/0232032 A1 | 9/2013 | Chaturvedi et al. | |
| 2013/0246265 A1 | 9/2013 | Al-Sahli | |
| 2013/0260734 A1 | 10/2013 | Jain et al. | |
| 2013/0290169 A1 | 10/2013 | Bathula et al. | |
| 2013/0317928 A1 | 11/2013 | Laracey | |
| 2014/0006129 A1 | 1/2014 | Heath | |
| 2014/0006276 A1 | 1/2014 | Grigg et al. | |
| 2014/0012750 A1 | 1/2014 | Kuhn et al. | |
| 2014/0019360 A1 | 1/2014 | Yang | |
| 2014/0074655 A1 | 3/2014 | Lim et al. | |
| 2014/0101048 A1 | 4/2014 | Gardiner et al. | |
| 2014/0114856 A1 | 4/2014 | Jung et al. | |
| 2014/0122310 A1 | 5/2014 | Torrens et al. | |
| 2014/0188718 A1 | 7/2014 | Grossman et al. | |
| 2014/0207680 A1 | 7/2014 | Rephlo | |
| 2014/0222670 A1 | 8/2014 | Concannon | |
| 2014/0250003 A1 | 9/2014 | Levchin et al. | |
| 2014/0279566 A1 | 9/2014 | Verma et al. | |
| 2014/0297435 A1 | 10/2014 | Wong | |
| 2014/0297520 A1 | 10/2014 | Levchin et al. | |
| 2014/0297524 A1 | 10/2014 | Ravindranath et al. | |
| 2014/0304095 A1 | 10/2014 | Fisher | |
| 2015/0089568 A1 | 3/2015 | Sprague et al. | |
| 2015/0140960 A1 | 5/2015 | Powell et al. | |
| 2015/0178693 A1 | 6/2015 | Solis | |
| 2015/0186875 A1 | 7/2015 | Zhang et al. | |
| 2015/0187021 A1 | 7/2015 | Moring et al. | |
| 2015/0193869 A1 | 7/2015 | Del Vecchio et al. | |
| 2015/0229622 A1 | 8/2015 | Grigg et al. | |
| 2015/0287015 A1 | 10/2015 | Kaplinger et al. | |
| 2015/0339662 A1 | 11/2015 | Huang et al. | |
| 2015/0371326 A1 | 12/2015 | Montesano et al. | |
| 2016/0004876 A1 | 1/2016 | Bye et al. | |
| 2016/0026999 A1 | 1/2016 | Kurian | |
| 2016/0042341 A1 | 2/2016 | Griffin et al. | |
| 2016/0086170 A1 | 3/2016 | Hurt et al. | |
| 2016/0092866 A1 | 3/2016 | Liberty et al. | |
| 2016/0092868 A1 | 3/2016 | Salama et al. | |
| 2016/0092874 A1 | 3/2016 | O'Regan et al. | |
| 2016/0125396 A1 | 5/2016 | Brickell et al. | |
| 2016/0125409 A1 | 5/2016 | Meredith et al. | |
| 2016/0125417 A1 | 5/2016 | Huang et al. | |
| 2016/0162889 A1 | 6/2016 | Badenhorst | |

FOREIGN PATENT DOCUMENTS

| | | |
|---|---|---|
| WO | WO-2014/111888 A1 | 7/2014 |
| WO | WO-2014/207615 A1 | 12/2014 |
| WO | WO-2015/023172 A2 | 2/2015 |
| WO | WO-2016/009198 A1 | 1/2016 |
| WO | WO-2016/097879 A1 | 6/2016 |

OTHER PUBLICATIONS

White, Ron, "How Computers Work", Que Publishing, 7th Ed, Oct. 15, 2003, p. 4. 23 pages.

* cited by examiner

| Payment Code Track 1 | | | | | | | | | | | | | | | | | | | | | | | | |
|---|---|---|---|---|---|---|---|---|---|---|---|---|---|---|---|---|---|---|---|---|---|---|---|---|
| 1 | 2 | 3 | ... | 8 | 9 | ... | 14 | 16 | 17 | 18 | 19 | 20 | 21 | 22 | 23 | ... | 32 | 33 | 34 | 35 | 36 | 37 | 38 | Positions |
| 1 | 1 | 2 | ... | 6 | 7 | 8 | ... | 14 | 15 | 16 | 17 | 18 | 19 | 1 | 1 | 2 | ... | 11 | 12 | 1 | 1 | 2 | 3 | 4 | |
| Format Code (FC) | Tokenized Primary Account Number (TPAN) | | | | | | | | | | | | | Field Separator (FS) | Customer Name | | | | | Field Separator (FS) | Expiration Date (ED) | | | | Field |
| B | Variable | | | | | | | | | | | | | < | Variable | | | | | < | Variable | | | | Content |
| Indicates the card type | Numeric; generated by Mobile Wallet server | | | | | | | | | | | | | Delimiter | Customer Name. Format will be LastName, FirstName (Ex. Robert Forrestor will be displayed as "Forre, Rober" | | | | | Delimiter | Format YYMM. where YYMM is a random number generated per the rule YY >15 & <=99 MM >=01 & <=12 | | | | Description |
| Char | Numeric | | | | | | | | | | | | | Char | String | | | | | Char | Numeric | | | | Type |
| Required | | | | | | | | | | | | | | | | | | | | | | | | |

| | | | | | | |
|---|---|---|---|---|---|---|
| 39 | 40 | 41 | 42 | 43 | 49 | 50 | 51 | ... | 73 | 74 | 75 | 76 | Positions |
| 1 | 2 | 3 | 1 | 2 | 8 | 9 | 10 | ... | 32 | 33 | 34 | 35 | |
| Service Code (SC) | | | Payment Token (WFPT) | | | | | | | | | | Field |
| 171 | | | Variable | | | | | | | | | | Content |
| Default Value. | | | Alphanumeric; generated by Mobile Wallet server | | | | | | | | | | Description |
| Numeric | | | String | | | | | | | | | | Type |

FIG. 5

| Positions | Field | Content | Description | Type |
|---|---|---|---|---|
| 1 | Format Code (FC) | Indicates the card type | Hex B | Numeric |
| 2–20 | Tokenized Primary Account Number (TPAN) | Variable | All Numeric values; generated by Mobile Wallet server | Numeric |
| 21 | Field Separator (FS) | = | Delimiter | Hex D |
| 22–25 | Expiration Date (ED) | Variable | Format YYMM where YYMM is a random number generated per the rule YY>15 & <=99 MM >=01 & <=12 | Numeric |
| 26–28 | Service Code (SC) | 171 | Default Value. | Numeric |
| 29–38 | Payment Token (WFPT) Subset that includes the prefix. | Variable | All Numeric values; generated by Mobile Wallet server | Numeric |

Payment Code Track 2 — Required

FIG. 6

| Wallet Representation of Primary Account Number | | | | | | | | | | | | | | | | | | | Positions |
|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | |
| IIN | | | | | | Trace ID | | | | | | | | Pseduo Check Digit | Last4 | | | | Field |
| Unique IIN | | | | | | Unique random numeric value. Will be used to validate transaction | | | | | | | | Luhn factor to calculate Check digit | Last 4 digits of Default Payment Type - Last digit is Check digit | | | | Description |
| Numeric | | | | | | Numeric | | | | | | | | | Numeric | | | | Type |
| Tokenized PAN | | | | | | | | | | | | | | | Required | | | | |

FIG. 7

| Positions | 1 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 |
|---|---|---|---|---|---|---|---|---|---|---|---|---|---|---|---|---|---|---|---|---|---|---|---|---|---|---|---|---|---|---|---|---|---|---|---|---|---|---|---|
| | | | | | | | | | | | | | | | | | | | Track 2 of Actual Card Number with Trace ID embedded | | | | | | | | | | | | | | | | | | | |
| | 1 | | 2 | 3 | 4 | 5 | 6 | 7 | 8 | 9 | 10 | 11 | 12 | 13 | 14 | 15 | 16 | 17 | 1 | 1 | 2 | 3 | 4 | 1 | 2 | 3 | 1 | 2 | 3 | 4 | 5 | 6 | 7 | 8 | 1 | 1 | 2 | 3 | 4 |
| Field | Format Code (FC) | | Card Number (PAN) (Debit or Credit) | | | | | | | | | | | | | | | | Field Separator (FS) | Expiration Date (ED) | | | | Service Code (SC) | | | Trace Id | | | | | | | | Offline QR Flag | | | | |
| Content | - - | | Variable | | | | | | | | | | | | | | | | = | Variable | | | | 520 | | | Variable | | | | | | | | 1 | | | | |
| Description | Indicates the card type | | Customer's Payment Type configured in Mobile Wallet | | | | | | | | | | | | | | | | Delimiter | Format YYMM Card Expiration Date | | | | Default Value. | | | Trace Id from the TPAN | | | | | | | | 0 if online, 1 if offline | | | | |
| Type | Hex B | | Numeric | | | | | | | | | | | | | | | | Hex D | Numeric | | | | Numeric | | | Numeric | | | | | | | | Numeric | | | | |
| | | | | | | | | | | | | | | | | | | | Required | | | | | | | | | | | | | | | | | | | | |

MOBILE WALLET USING TOKENIZED CARD SYSTEMS AND METHODS

BACKGROUND

The present disclosure relates generally to the field of systems that use mobile devices to transfer funds. More specifically, the present disclosure relates to systems and methods for enabling individuals to use their electronic devices to transfer funds, purchase products and services.

Payments for products and services are often completed using credit cards, debit cards, checks, or cash. At the same time, most people carry some type of mobile handheld electronic device, such as a cellular phone, smart phone, mobile handheld wireless e-mail device, personal digital assistant, portable gaming devices, and so on. Most of these devices tend to have a wireless Internet connection. A person may wish to make payments to merchants or other individuals using these mobile devices. Likewise, a person may wish to transfer funds to other individuals using their mobile devices. Enhanced systems and methods of facilitating such transactions would be desirable.

SUMMARY

One embodiment of the present disclosure relates to a computer-implemented method that includes sending, by a mobile wallet server, an identification number that is part of a substitute card number to be used by a mobile device as a mobile wallet, determining an actual card number based on the substitute card number and sending the actual card number and the identification number for processing a payment.

Another embodiment of the present disclosure includes a system that has a mobile wallet server that is configured to generate a substitute card number to be used to conduct a mobile wallet transaction using a mobile device, the mobile wallet server is configured to receive from a merchant computer system the substitute card number requesting the actual card number, and the mobile wallet server is configured to determine the actual card number by using a portion of the substitute card number. The mobile wallet server may be configured to transmit the actual card number with a portion of the substitute card number for verification by a fund source bank computer system.

Another embodiment includes a computer system having a processor coupled to machine readable storage media having instructions stored therein that, when executed by the processor, cause the processor to send, by a mobile wallet server, an identification number that is part of a substitute card number to be used by a mobile device as a mobile wallet, and determine an actual card number based on the substitute card number. The processor configured to send the actual card number and the identification number for processing a payment.

One embodiment of the present disclosure relates a computer-implemented method that includes generating a tokenized card number based on an actual card number comprising, and replacing the issuer identifier of the actual card number with a new issuer identifier number that belongs to a financial institution providing a mobile wallet server. The method includes generating, by the mobile wallet server, a plurality of generated numbers for the tokenized card number to replace an equivalent number of digits in the actual card number and retaining at least the last four digits of the actual card number in the tokenized card number.

Another embodiment of the present disclosure relates to a mobile wallet server comprising a processor coupled to machine readable non-transitory storage media having instructions stored therein that, when executed by the processor, cause the processor to send, using a mobile device, a request for a tokenized card number to be provided to a merchant. The processor may be configured to generate a tokenized card number based on an actual card number, replace the issuer identifier of the actual card number with a new issuer identifier number. The processor may be configured to generate a plurality of randomly generated numbers for the tokenized card number to replace an equivalent number of digits in the actual card number and the processor may be configured to generate a checksum helper digit such that the combination of the issuer identification number, the randomly generated number and the checksum helper digit result in a checksum that is equal to at least one of the last four digits of the actual card number.

Yet another embodiment of the present disclosure relates to a mobile device that includes a processor configured to request a tokenized card number for a transaction from a mobile wallet server and receive a tokenized card number that is determined based on an actual card number. The tokenized card number includes an issuer identifier that corresponds to the mobile wallet server. The tokenized card number further comprises randomly generated numbers that replace an equivalent number of digits in the actual card number. The tokenized card number further includes at least a few digits from the actual card number.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

DETAILED DESCRIPTION

Before turning to the figures which illustrate the exemplary embodiments, it should be understood that the application is not limited to the details or methodology set forth in the following description or illustrated in the figures. It should also be understood that the phraseology and terminology employed herein is for the purpose of description only and should not be regarded as limiting.

Referring generally to the figures, systems and methods for providing token generation and validation features for a payment processing system are described. More particularly, the present disclosure relates to the use of codes with tokens for validation during payment processing. The codes may be transmitted, e.g., using optical image methods (e.g., QR code), NFC, wireless, Bluetooth, low energy Bluetooth, RFID, hypersonic, Wi-Fi, cellular 3G, 4G, GSM, LiFi, etc. The systems and methods described herein may be implemented for users having a mobile wallet implemented on a mobile device. The mobile wallet allows the user access to accounts via the mobile device to provide payments to merchants or other users. The systems and methods described herein allow for integration between a mobile wallet server and a merchant for processing a payment.

In an embodiment of the present disclosure, a code representing a substitute card number may be generated and formatted for use as part of a validation system. When a user registers for a mobile wallet account, a customer token may be generated for the user and a device token may be generated for the device used by the user. The customer token and device token may be used to verify further transactions between the user and the mobile banking system or mobile wallet account.

When the user logs into his or her their mobile wallet and wishes to make a payment using funds in the user's accounts, the customer token and device token are sent or provided to a server system. A substitute card number (tokenized) including a trace ID number as described below may be provided to the user. The wallet server and a point of sale (POS) device, e.g., at the store location at which the payment is to be submitted, use the substitute credit card number to authenticate the transaction. The substitute card number may be formatted to include a portion of an actual card number held by the user, e.g., so that the last four digits appearing on a receipt provided to the user match those of the user's actual card number, even though a substitute card number was provided to the merchant to process the payment.

Figure 1:
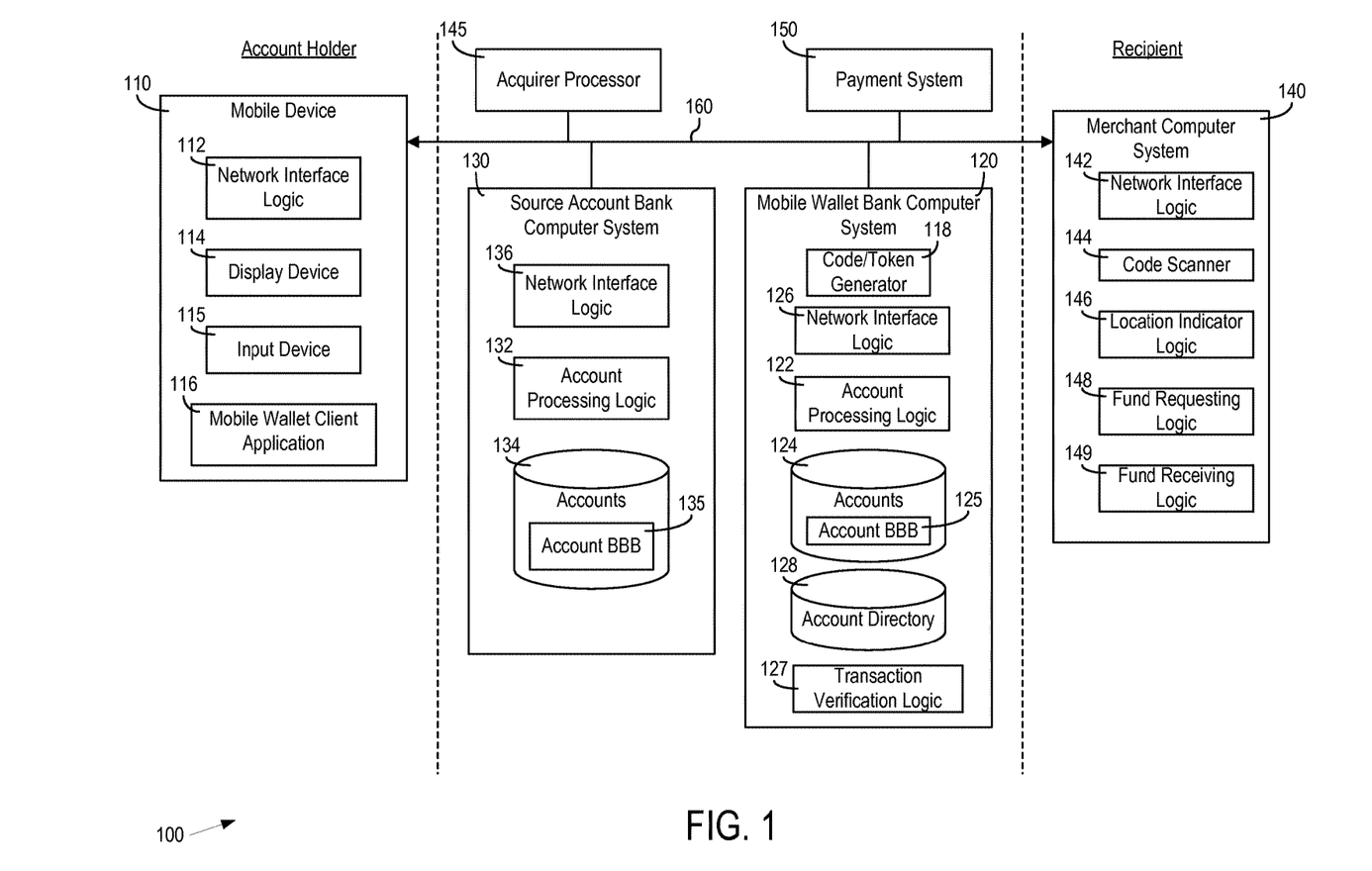
FIG. 1 is a block diagram of a computer-implemented payment processing system, according to an example embodiment.

Referring to FIG. 1, a computer-implemented payment processing system 100 is shown, according to an exemplary embodiment. The payment processing system 100 may be used to set up and utilize a mobile wallet. The user may be a business entity and/or an individual consumer that has one or more source accounts with a financial institution. The source accounts may include business or consumer demand deposit, credit card, debit card accounts, lines of credit, and so on. The mobile wallet account may be created for the user to transmit funds from a source account to pay for goods or services to a merchant. Additionally, funds can be transferred from the source account to another person.

The payment processing system 100 may include, among other systems, a mobile device 110, a mobile wallet bank computer system 120, a source account bank computer system 130, a merchant computer system 140, an acquirer/processor computer system 145 and a payment system 150. The various systems may communicate through a network 160, which may include one or more of the Internet, cellular network, Wi-Fi, Wi-Max, a proprietary banking network, or any other type of wired or wireless network. In some embodiments, the mobile wallet bank computer system 120 and source account bank computer system 130 may be owned by the same entity. In other embodiments, the mobile wallet bank computer system 120 and source account bank computer system 130 may be owned by a different entity.

The mobile wallet bank computer system 120, the source account bank computer system 130, the acquirer/processor computer system 145 and the payment system 150 may each include a computer system (e.g., one or more servers each with one or more processing circuits), each including a processor and memory. The processors may be implemented as application specific integrated circuits (ASICs), one or more field programmable gate arrays (FPGAs), a group of processing components, or other suitable electronic processing components. The memory may be one or more devices (e.g., RAM, ROM, Flash memory, hard disk storage, etc.) for storing data and/or computer code for completing and/or facilitating the various processes described herein. The memory may be or include non-transient volatile memory, non-volatile memory, non-transitory computer storage media. The memory may include data base components, object code components, script components, or any other type of information structure for supporting the various activities and information structures described herein. The memory may be communicably connected to the processor and include computer code or instructions for executing one or more processes described herein.

The mobile wallet account may be established in a variety of ways, for example, through an online banking area of a website of the banking institution that operates the mobile wallet bank computer system 120.

The mobile device 110 may be used by an individual user (e.g., a business owner or employee, a consumer, etc.) to create and interact with a mobile wallet account. The mobile device 110 may, for example be, a cellular phone, smart phone, mobile handheld wireless e-mail device, personal digital assistant, portable gaming device, or other suitable device. The mobile device 110 includes a network interface logic 112, a display device 114, an input device 115, and a mobile wallet client application 116. The network interface logic 112 may include, for example, program logic that connects the mobile device 110 to the network 160. For example, the mobile device 110 may receive and display screens including account information, transaction instructions, and so on. In one embodiment, a screen may be used to request a username and password information from the user, to prompt the user to provide information regarding the amount of a payment and which merchant or individual (e.g., name, address, phone number or e-mail, a selection of a recipient by the user from his/her memory or from the mobile device 110, etc.) is to receive the payment. Such screens are presented to the user via the display device 114. The input device 115 may be used to permit the user to initiate account access and to facilitate receiving requested information from the user. The input device 115 may include, for example, a keypad or keyboard, a touchscreen, a microphone, or any other device that allows the user to access the payment processing system 100. As will be appreciated, in addition to or instead of the mobile device 110, users may also be provided with the ability to access the payment processing system 100 using another type of computer (e.g., a desktop or laptop computer executing browser software) to perform the operations described herein as being performed by the mobile device 110.

The mobile wallet client application 116 or mobile wallet circuit may include program logic executable by mobile device 110 to implement at least some of the functions described herein. As will be appreciated, the level of functionality that resides on the mobile device 110 as opposed to the mobile wallet bank computer system 120 may vary depending on the implementation. The client application 116 may provide an interface that is configured to receive and display mobile web pages received from the mobile wallet bank computer system 120 (e.g., web pages prompting the user to provide information to create an account, web pages displaying account balance information and past transactions, and so on). Upon initiation of a transaction, the client application 116 may request data from the mobile wallet computer system 120 to generate a unique code/token. The unique code/token may then be transmitted by the mobile device 110 to the merchant computer system 140 as part of a transaction to facilitate authentication of the transaction. In other embodiments, the mobile wallet bank computer system 120 may implement the code/token generator.

The mobile wallet client application 116 is used in connection with merchant computer system 140 located at a brick and mortar store location. Additionally, the mobile wallet application 116 may also be used in connection with online merchant transactions. In another embodiment, merchants may be provided with the ability to have a mobile storefront and profile within the mobile wallet client application 116. For example, merchants may be provided with the ability to display marketing material, provide information, and promote products or discounts. Merchants may also be provided with the ability to sell items directly through their mobile storefront for the account holder to purchase from within the mobile wallet client application 116.

The mobile wallet client application 116 may offer a user to choose any one of the accounts for transferring funds to the merchant for goods or services. An account holder may select a default account that is used to make payments. The account holder may use account selection logic to select the account the account holder wants to use to pay the merchant or other recipient.

The mobile wallet bank computer system 120 includes code/token generator 118, account processing logic 122, an accounts database 124, network interface logic 126, transaction verification logic 127, and an account directory 128. In one embodiment, the mobile wallet bank computer system 120 is operated by a first banking entity that maintains and handles transaction processing for mobile wallet accounts. The mobile wallet accounts may be created via interaction of the mobile wallet application 116 with the mobile wallet bank computer system 120. The user may or may not have conventional bank accounts with the banking entity that maintains the mobile wallet bank computer system 120. If the user does not have bank accounts with the entity that maintains the mobile wallet bank computer system 120, then accounts associated with another banking entity may also be used. Again, in such an embodiment, the flow of funds into and out of the mobile wallet accounts may also be processed by the first banking entity using the mobile wallet bank computer system 120.

The mobile wallet bank computer system 120 is configured to store information regarding mobile wallet accounts. By way of example, information for a specific mobile wallet account 125 is shown as being stored in the accounts database 124. As will be appreciated, the accounts database 124 may also store information regarding many other mobile wallet accounts (not shown). As will also be appreciated, the extent to which transaction details are tracked and maintained in account processing logic 122 and stored in a storage database provided by the mobile wallet bank computer system 120 may vary in differing embodiments. The account database 124 may store details regarding credit card accounts. In particular, the account database 124 may store each financial transaction that occurred. Each financial transaction may include the amount of the transaction and the merchant.

The code generator 118 may receive a request from an account holder to initiate a transaction. In response, the code generator 118 may generate a code that may be transmitted by the mobile device 110 to the merchant computer system 140. As will be appreciated, any suitable method may be used to transmit the code. In various embodiments, the code may be transmitted using optical image methods (e.g., QR code), NFC, wireless, Bluetooth, low energy Bluetooth, RFID, hypersonic, Wi-Fi, cellular 3G, 4G, GSM, LiFi, etc. For purposes of providing an example, it is sometimes assumed in the discussion of FIGS. 1-8 that an optical method is used (e.g., QR code). In various embodiments, the code may be generated without the account holder providing the merchant's name or amount of transaction. The code generator 118 can be configured to generate a code that incorporates at least one of a date, time, trace ID, unique transaction identifier, and geographic location of the mobile device. In other embodiments, the code generator 118 may generate a tokenized numerical code that is in the Track 1 and Track 2 formats as specified by the ISO 8583 specification.

The code may incorporate at least a portion of an account number for a source account that is associated with the mobile wallet account. The incorporated user account number indicates the payment method to be associated with the transaction (e.g., which of the user's credit cards will be used for the transaction). The code may be generated such that a combination of random digits and a portion of a payment card number are included in the code, e.g., so that the last four digits appearing on a receipt provided to the user match those of the user's actual card number, even though a substitute card number was provided to the merchant. The various fields of such a code, and the format of such a code, are described in greater detail in FIGS. 5-8.

The mobile wallet account 125 holds funds that are transmitted to a recipient 140 upon receiving instructions from the user through the mobile device 110. As described below, funds flow into and out of the mobile wallet account 125 through the payment system 150. The mobile wallet account logic 120 is connected to the payment system 150 through the network 160. The network interface logic 126 may include, for example, program logic that connects the mobile wallet bank computer system 120 to the network 160.

The mobile wallet bank computer system 120 further includes transaction verification logic 127. The transaction verification logic 127 may receive a transaction amount from the merchant computer system 140. In some embodiments, the transaction verification logic 127 may generate a message to send to the mobile device 110 for verifying the transaction amount. Upon receiving the verification message, the account holder via the mobile device 110 may approve or deny the transaction amount for the mobile wallet bank computer system 120.

The source account computer system 130 includes account processing logic 132, an accounts database 134, and network interface logic 136. In an example embodiment, as previously indicated, during registration process for the mobile wallet account 125, the user may be prompted to identify a source account 135, that is, a source of funds for the mobile wallet account. The source account 135 may be an existing demand deposit account or a credit card account held by the user with the same financial institution or another financial institution. When the mobile wallet account 125 is created, the user is prompted to provide bank account information (e.g., routing number and/or account number) for the source account 135 that is used as a source of funds for the mobile wallet account 125. Thus, the financial institution that provides the mobile wallet account 125 for the user and the financial institution that typically provides banking services to the user may be two different financial institutions. In such situations, a second banking entity that maintains and handles transaction processing for source accounts may operate the source account computer system 130. In other situations, the computer systems 120 and 130 may be considered as being integrated in a single payment processing system (e.g., if the two financial institutions are the same). As will be appreciated, in a situation where the mobile wallet computing system 120 has many users, some users may have all their mobile wallet source accounts at the same bank that operates the mobile wallet computer system 120, some users may have all their mobile wallet source accounts at a bank other than the same bank that operates the mobile wallet computer system 120, and some users may have some of their mobile wallet source accounts at the same bank that operates the mobile wallet computer system 120 and other of their mobile wallet source accounts at a bank other than the bank that operates the mobile wallet computer system 120.

The merchant computer system 140 may be used at a point of sale location to conduct transactions with the account holder. For example, the merchant computer system 140 may include a point of sale computer system such as a cash register system connected to a central server system operated by the merchant. As another example, the merchant computer system 140 may include a mobile computing device (e.g., smart phone, tablet PC, etc.) operated by a store clerk as the clerk moves throughout the store. Again, the mobile computing device in such an embodiment may connect to a central server system operated by the merchant.

The merchant computer system 140 includes network interface logic 142, a code scanner 144, location indicator logic 146, fund requesting logic 148, and fund receiving logic 149. In one embodiment, the network interface logic 142 is configured to allow the merchant computer system 140 to communicate with the network 140. The network interface logic 142 sends and receives data from the mobile device 110 and the mobile wallet bank computer system 120.

The code scanner 144 may be configured to scan codes, such as but not limited to, optically scanned or non-optically scanned codes. In the embodiment of the present disclosure, the code scanner 204 scans one or more types of codes. After receiving the code, the scanner 144 determines the information that was incorporated into the code by the mobile device 110 or the mobile wallet bank computer system 120 that generated the code, as described below.

The location indicator logic 146 provides an indication of the geographic location of the code scanner 144. In one embodiment, the location indicator logic 146 may be programmed with the known address of the merchant location as the location of the code scanner, such that the location of the merchant can be compared with the location of the mobile device 110 as part of authenticating a transaction.

The fund requesting logic 148 communicates a fund request via the network interface logic 142 to the acquirer/processor computer system 145. In some embodiments, the fund requesting logic 148 may send the tokenized card number (that includes an issuer identification number (IIN), trace ID (generated numbers), checksum helper digit, last 4 digits of the actual card number) received from the user to the acquirer/processor computer system 145. In response to receiving a tokenized card number, the acquirer processor computer system 145 sends the tokenized card number to the mobile wallet bank computer system 120, which in turn sends the actual card number and a trace ID (embedded within the issuer discretionary field) to the acquirer processor computer system 145. The fund receiving logic 149 determines when payment has been received by the merchant computer system 140 and allocates the payment accordingly.

The merchant computer system 140 may further connect to or integrate with other hardware. For example, in one embodiment, the merchant computer system 140 may connect to a card reader for reading credit cards, debit cards, stored value cards, and so on. As another example, the merchant computer system 140 may be configured to prompt the user to provide a random security code. The random security code may be generated by the mobile device 110, by a separate security dongle, or in another manner. The security code may be provided to the merchant computer system 140 directly by the mobile device, may be keyed into the merchant computer system 140 (e.g., by a store clerk), or may be received in another manner.

The acquirer processor computer system 145 includes a computer system that transmits and receives messages from the mobile wallet bank computer system 120, the merchant computer system 140, and the payment system 150. In various embodiments, the acquirer processor 145 may receive the tokenized card information and route the received information to the mobile wallet bank computer system 120. The acquirer processor 145 may receive the actual card information from the mobile wallet bank computer system 120 with the trace ID embedded within the issuer discretionary field in track 2 format. In some embodiments, the acquirer processor computer system 145 may transmit the actual card information with the trace ID to the payment system 150. In various embodiments, the acquirer processor computer system 145 may process the payment in the mobile wallet system described herein.

The payment processing system 100 may further include additional bank computer systems that may allow the mobile wallet platform of the present disclosure to be accessed by consumers and merchants that bank at various different banking institutions. The additional bank computer systems may provide the services described herein through multiple banks, allowing for broader adoption of the mobile wallet platform.

Figure 2:
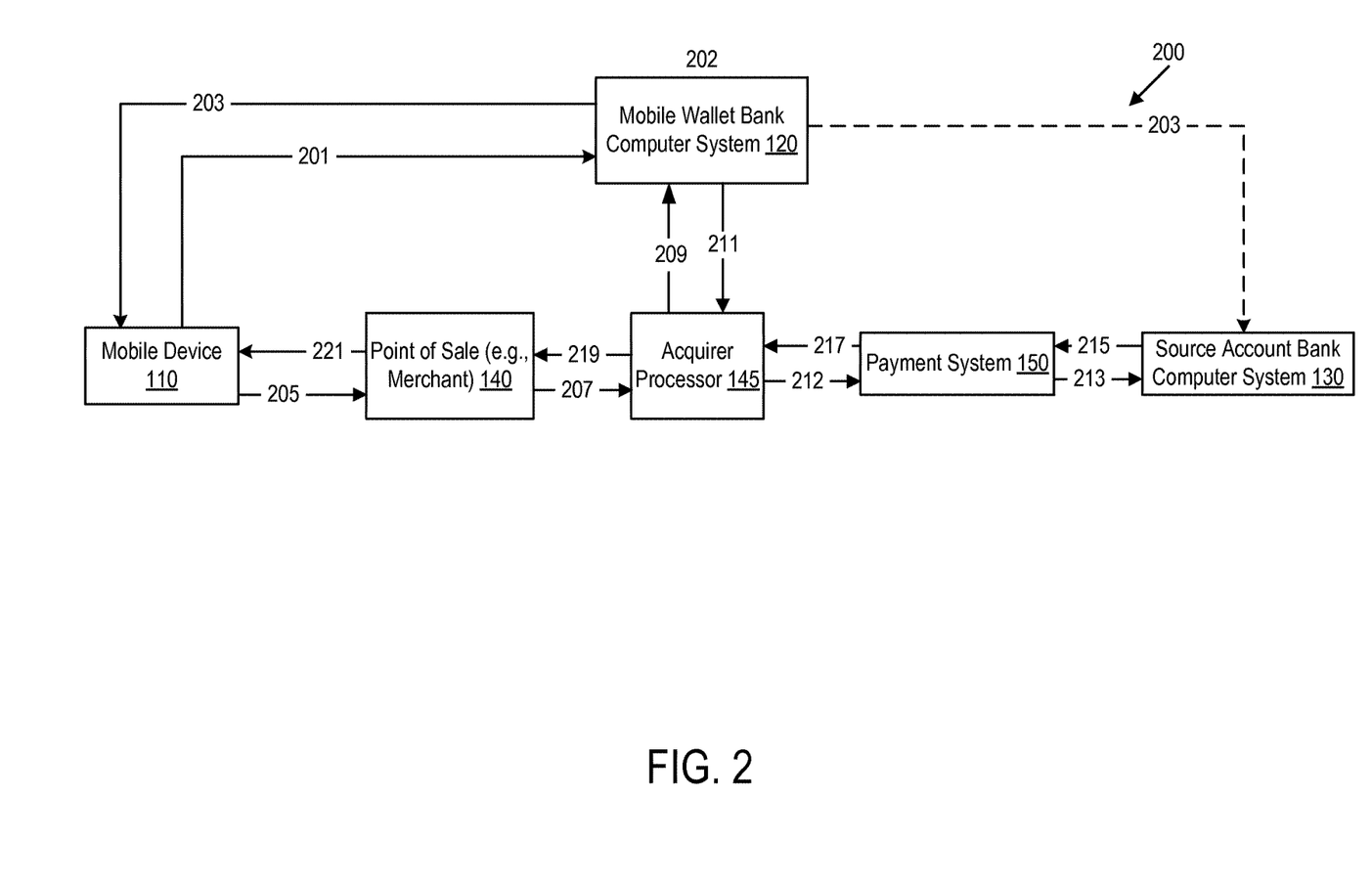
FIG. 2 illustrates a payment process that may be implemented by the system in FIG. 1 according to an example embodiment.

FIG. 2 illustrates a process 200 that may be implemented by the system in FIG. 1. When a user wishes to make a payment at a merchant, for example, the user may access the mobile wallet client application 116 by entering a PIN or other login credentials and then selecting a "pay now" or similar button. For example, the user may be located at a merchant location and may wish to pay for a good or service. As another example, the user may be located away from the merchant location or be engaged in an online transaction.

At step 201, the mobile device 110 requests access to funds in the mobile wallet via the mobile wallet bank computer system 120 to pay for a good or service. The mobile device 110 may provide a PIN, a customer ID, and a device ID to the mobile wallet bank computer system 120. The user may be identified and authenticated based on a match of these three data elements with information stored in the mobile wallet bank computer system 120. Further, the user's mobile wallet account information may be located/determined.

Next, at step 202, the mobile wallet bank computer system 120 may generate a tokenized credit card number as described in greater detail below. The tokenized credit card number may include a few generated numbers and a few numbers from the actual credit card number. In one embodiment, the tokenized credit number starts with an issuer identification number (IIN) that corresponds to the mobile wallet bank computer system 120, ends with the last four digits of the actual credit card account number of the credit card that is being used in the transaction, and further includes intervening digits including a trace ID and a checksum helper digit. The trace ID is described in further detail below and allows for enhanced authentication during the payment process. The may permit checksum verification of the tokenized credit card number. Various checksum algorithms may be used to verify that the tokenized credit card number is a valid credit card number.

The tokenized credit card number may be transmitted to the mobile device 110 in the form of a code. For example, the data may be encoded in accordance with the track 1 and/or track 2 formats used in the magnetic stripes of credit cards. In some embodiments, the code is formatted in Track 2 format. In either case, the primary account number field may contain the tokenized credit card number and the issuer discretionary field may contain the payment token. In yet other embodiments, another format is used.

At step 203, the tokenized credit card number is transmitted to the mobile device 110. If the mobile wallet bank computer system 120 and the source account computer system 130 are different computer systems (e.g., if the user is using a credit card that is provided by a different bank than the bank the operates the mobile wallet computer system 120), then the trace ID may also be sent to the source account computer system 130 at step 203.

At step 205, the mobile device 110 may display or otherwise transmit the tokenized credit card number to merchant computer system 140 (e.g., using a QR code, NFC, wireless, Bluetooth, low energy Bluetooth, RFID, hypersonic, Wi-Fi, cellular 3G, 4G, GSM, LiFi, or other method). At step 207, after receiving the tokenized card number, the merchant computer system 140 sends the transaction to an acquirer processor computer system 145 for processing.

Next, at step 209, the acquirer processor 145 sends the tokenized card number to the mobile wallet bank computer system 120. After receiving the request from the acquirer processor 145, the mobile wallet bank computer system 120 may determine the actual card number and send the actual card number back to the acquirer processor at step 211. In one embodiment, the determination of the actual card number may occur by searching for the account information associated with the payment token and/or trace ID within the tokenized card number. Additionally, the trace ID from the tokenized card number may be sent with the actual card number at step 211. At this point, the issuer discretionary field is no longer need for the payment token, hence, the trace ID may be sent to the acquirer processor computer system 145 in the issuer discretionary field.

At step 212, the acquirer processor computer system 145 sends the actual card number and the trace ID to the payment system 150 for processing a payment. The payment system 150 sends the actual card number with the trace ID and the transaction amount to the source account bank computer system 130 at step 213. The source account bank computer 130 may retrieve the trace ID that was received from the mobile wallet bank computer system 120 by searching for the actual card number that was received from the payment system 150. The source account bank computer 130 may compare the trace ID that was received/stored at step 203 with the trace ID that was received from the payment system 150 at step 213. Assuming there is a match, the source account bank computer 130 may issue an approval for the transaction. After verifying the actual card number and the trace ID in the issuer discretionary field, the source account bank computer system 130 may send an approval to the payment system 150 at step 215. The approval message may be sent from the payment system 150, to acquirer processor 145, to the point of sale system 140, in steps 217 and 219. Upon receiving the approval message the point of sale system 140 may generate a receipt for the user. In some embodiments, the receipt may be sent to the mobile device 110 electronically. In other embodiments, the receipt may be printed physically at the point of sale location. The receipt may include the last four digits of the actual credit card account number of the credit card that was used in the transaction.

The use of the payment token and trace ID as described herein allows for two levels of authentication. The payment token is generated by the mobile wallet computer system at step 202. The payment token is then transmitted to the mobile device 110, then to the merchant computer system 140, then to the acquirer processor computer system 145, and eventually back to the mobile wallet computer system 202 where it is matched with the original payment token generated at step 202. Similarly, the Trace ID is also generated by the mobile wallet computer system at step 202, and then transmitted to the mobile device 110, then to the merchant computer system 140, then to the acquirer processor computer system 145, and eventually back to the mobile wallet computer system 202 where it is matched with the Trace ID generated at step 202. In the case of the Trace ID, however, the Trace ID is then further transmitted back to the acquirer processor computer system 145, then to the payment system 150, and then to the source account computer system 130 where it is matched with the Trace ID generated at step 202. Accordingly, the trace ID used in conjunction with the tokenized credit card number allows both the mobile wallet bank computer system 140 and the source account bank computer system 130 to authenticate the transaction. Using the trace ID in the above described manner may permit the source account bank computer system 130 and the mobile wallet bank computer system 120 to verify the trace ID at least twice prior to approving a transaction and transferring funds. Further, and as described in greater detail below, the trace ID may be used by the source account computer system 130 to determine whether the credit card transaction was a mobile wallet transaction (e.g., as opposed to an in-person card-present transaction involving use of the user's physical credit card, as opposed to an online transaction, and so on). Hence, the source account bank computer system 130 may provide a different customer experience to the mobile wallet user. The source account bank computer system 130 may also determine risk differently for transactions that use a mobile wallet.

In some embodiments, instead of embedding the trace ID in a tokenized credit card account number at step 202, the actual credit card number is transmitted to the mobile device 110 and the merchant computer system 140. In such an embodiment, the trace ID may be included in the issuer discretionary field at step 202, and the payment token may be communicated in another manner or another payment matching mechanism may be used. The trace ID may be stored in the issuer discretionary field and may travel though the payment processing system, until it is verified by the source account bank computer system 130. After being verified by the source account bank computer system 130, the transaction may be approved and the funds may be transferred from the source account bank computer system to the acquirer processor 145. In other embodiments, the same financial institution may own the source account bank computer system 130 and the mobile wallet bank computer system 120.

Figure 3:
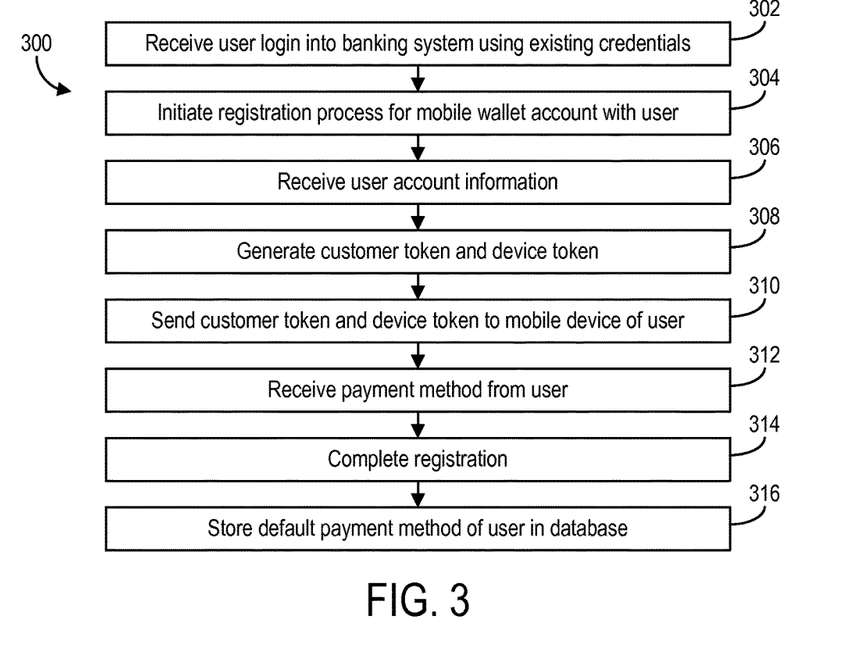
FIG. 3 illustrates a user registration process and a token generation process during registration, according to an example embodiment.

Referring now to FIG. 3, a flow chart of a process 300 detailing a user registration process and a token generation process during registration is shown, according to an exemplary embodiment. Process 300 may be executed by a mobile device 110 and a mobile wallet bank computer system 120 that is configured to create and manage a mobile wallet account. Process 300 may be executed for a user who wishes to start a mobile wallet account 125 for a source account 135. In the example of FIG. 3, it is assumed that the user has an account at the bank that operates the mobile wallet computer system 140. As will be appreciated, a similar processed may be used for users that have accounts only at other banks.

Process 300 includes receiving user authentication information into the mobile wallet bank computer system 120 using existing financial institution credentials (step 302). Existing credentials may include, for example, a username and password combination or card information (card number, account number, expiration date, CVV) for an online banking website of the bank that operates the mobile wallet computer system 120. In one embodiment, the credentials may match the credentials that are used to access the source account. In other embodiments, other authentication techniques may be used (e.g., using facial recognition on a captured image or video of the user on a camera of the mobile device, voice or speech recognition captured by an input device of the mobile device, fingerprint authentication, etc.).

Process 300 further includes initiating a registration process for a mobile wallet account with the user (step 304). Step 304 includes receiving a user indication to create a new mobile wallet account. In some embodiments, the user may be presented with a menu option on his or her mobile device to create a new mobile wallet account, among other options.

Process 300 further includes receiving user account information (step 306). Receiving the user account information may include prompting the user to provide a PIN number associated with a debit card or credit card held by the user at the bank. The user may also be prompted to identify the source account(s) the user wishes to associate with the mobile wallet account. For example, the user may enter information about accounts held at other banks that may serve as source accounts. In various embodiments, the user may be presented with various fields on the mobile device that allow the user to select one or more source accounts held by the user, to enter account information (e.g., an account number) in one or more fields, or otherwise. For example, the user may be presented with a list of accounts the user has with a particular source account bank computer system, and may choose one or more accounts to view account information and to select the account for use with the mobile wallet account. The user may further provide information to create a user profile including other information as warranted.

Process 300 further includes generating a customer token and device token (step 308), and sending the customer token and device token to the mobile device of the user (step 310). The customer token and device token may be tokens that identify the user and the associated mobile device to the mobile wallet bank computer system in the future. The tokens are encrypted by the mobile wallet bank computer system and provided to the mobile device. The mobile device stores the tokens for future use. In example embodiment, each time the user accesses the mobile wallet system with a new mobile device 110, the mobile device is assigned its own device token. A device and customer token are stored on each device in order to bind the device to the user (one device can only have one wallet user, but one user can have multiple devices). Once a mobile device for mobile wallet account is registered, the user only needs to enter their existing PIN to access their mobile wallet from the registered device. The full login credentials associated with online banking are not needed. Instead, possession by the user of the registered device provides an additional level of authentication that avoids the need for full login credentials.

Process 300 further includes receiving a default payment method from the user (step 312) and completing the registration (step 314). Step 314 may include a user accepting terms and conditions associated with use of the mobile wallet account. The default payment method may indicate how a user wishes to normally pay for a particular transaction. For example, the user may provide options relating to how to manage overdrafts, whether the total payment should be provided in one or more payments, or otherwise. Process 300 may include storing the default payment method (step 316) in the profile database of the mobile wallet bank computer system 120 (or another database of the mobile wallet bank computer system). The default payment method may be recalled by the mobile wallet bank computer system 120 during a future payment process.

Process 300 may also include generating and sending an offline code token to the source account bank computer system. The offline code may be used by the payment processing system, and more particularly the source account bank computer system, to execute a payment for the user when the mobile device is offline, or for other account management purposes. In some embodiments, the mobile device may store one or more offline codes to provide to the merchant. The mobile device 110 may not contact the mobile wallet bank computer system 120 and may provide the code to the merchant computer system 140.

Figure 4:
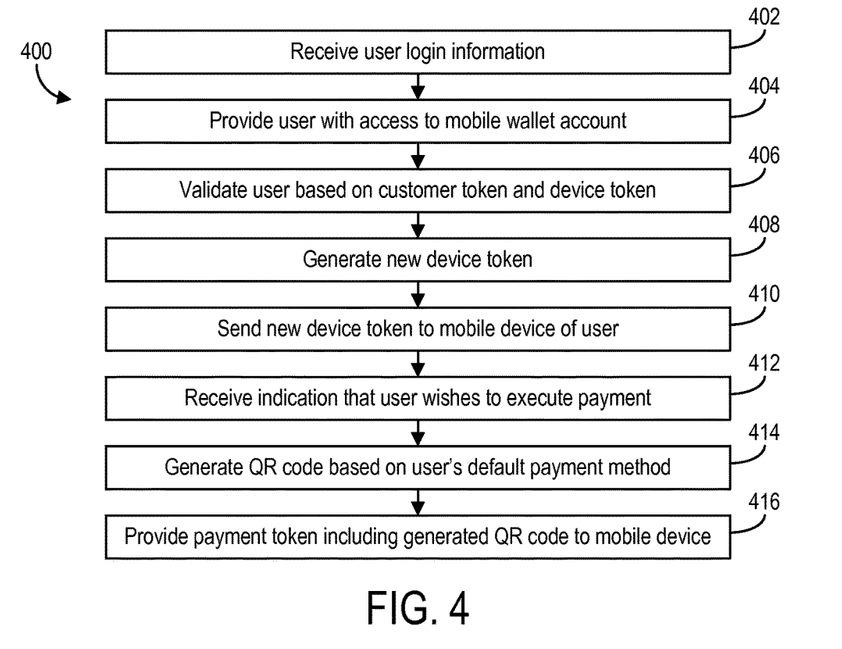
FIG. 4 illustrates a payment code generation process for an authenticated mobile wallet session, according to an example embodiment.

Referring now to FIG. 4, a flow chart of a process 400 detailing a payment code generation process for an authenticated mobile wallet session is shown, according to an exemplary embodiment. Process 400 may be executed for a user requesting to execute a payment (e.g., transaction) with a merchant or other recipient 140. Process 400 may be executed by a mobile wallet bank computer system 120 configured to manage the user mobile wallet account.

Process 400 includes receiving a PIN from the user (step 402) to authenticate the user. At step 402 the mobile wallet client applicant 116 fails to ask for the user's usual banking authentication credentials (username and password). Instead, at step 402 the mobile wallet client application 116 prompts the user for a PIN that was used during the registration steps in process 300. In an alternative embodiment, user may log into a mobile banking session with a source account bank computer system, or the user may directly access the mobile wallet bank computer system. Process 400 further includes allowing the user access to his or her mobile wallet account (step 404). For example, the user may access his or her mobile wallet account through his or her account at the source account bank computer system, or may log into his or her mobile wallet account at the mobile wallet bank computer system by providing a PIN or other identifier to the mobile wallet bank computer system.

Process 400 further includes validating the user based on the customer token and device token (step 406). When the user logs in to access his or her mobile wallet account, the customer token and device token stored on the mobile device (stored during step 310 of process 300) are provided to the mobile wallet bank computer system. The mobile wallet bank computer system validates the user and/or the mobile device for use with the mobile wallet account. Step 406 may further include validating the user based on the PIN or other identifier also provided to the mobile wallet bank computer system. For example, in order to be validated, the customer token, the device token, and the PIN may all need to match (i.e., be associated with each other in the mobile wallet computer system 120). As previously indicated, each user may have one customer token and one PIN which together are associated with multiple device tokens (such that the user can access the mobile wallet account from multiple devices).

Process 400 further includes generating a new device token (step 408), and sending the new device token to the mobile device of the user (step 410). Hence, in some embodiments, the device token may change each time the user uses the device. The device token may be a token that will identify the user and the associated mobile device to the mobile wallet bank computer system in the future. More particularly, the device token may identify a current session of the user. In other words, the token may be used to identify a particular function that the user may perform during the session, such as initiating a purchase. The token is encrypted by the mobile wallet bank computer system and provided to the mobile device. The mobile device stores the device token for future use.

Process 400 further includes receiving an indication that the user wishes to execute a payment or other transaction (step 412). Upon the indication, the mobile wallet bank computer system generates a code (e.g., a QR code) based on the user's default payment method (step 414). The QR code is generated including a combination of random digits and account information of the user. For example, the QR code may include the last four digits of a debit card or credit card number of an account associated with the user and the request. The account information may be used to identify a source account for the transaction at a later step in the transaction. The mobile wallet bank computer system 120 may use token information (e.g., customer token and device token information) from the mobile device to identify the mobile wallet account and associated source account to use in code generation. The code may provide credit card data or tokenized credit card data in Track 1 or Track 2 format, as described below with reference to FIGS. 5-7. The generated code is then provided as part of a payment token to the mobile device and/or to the merchant or other recipient of the payment or funds (step 416).

Figure 5:
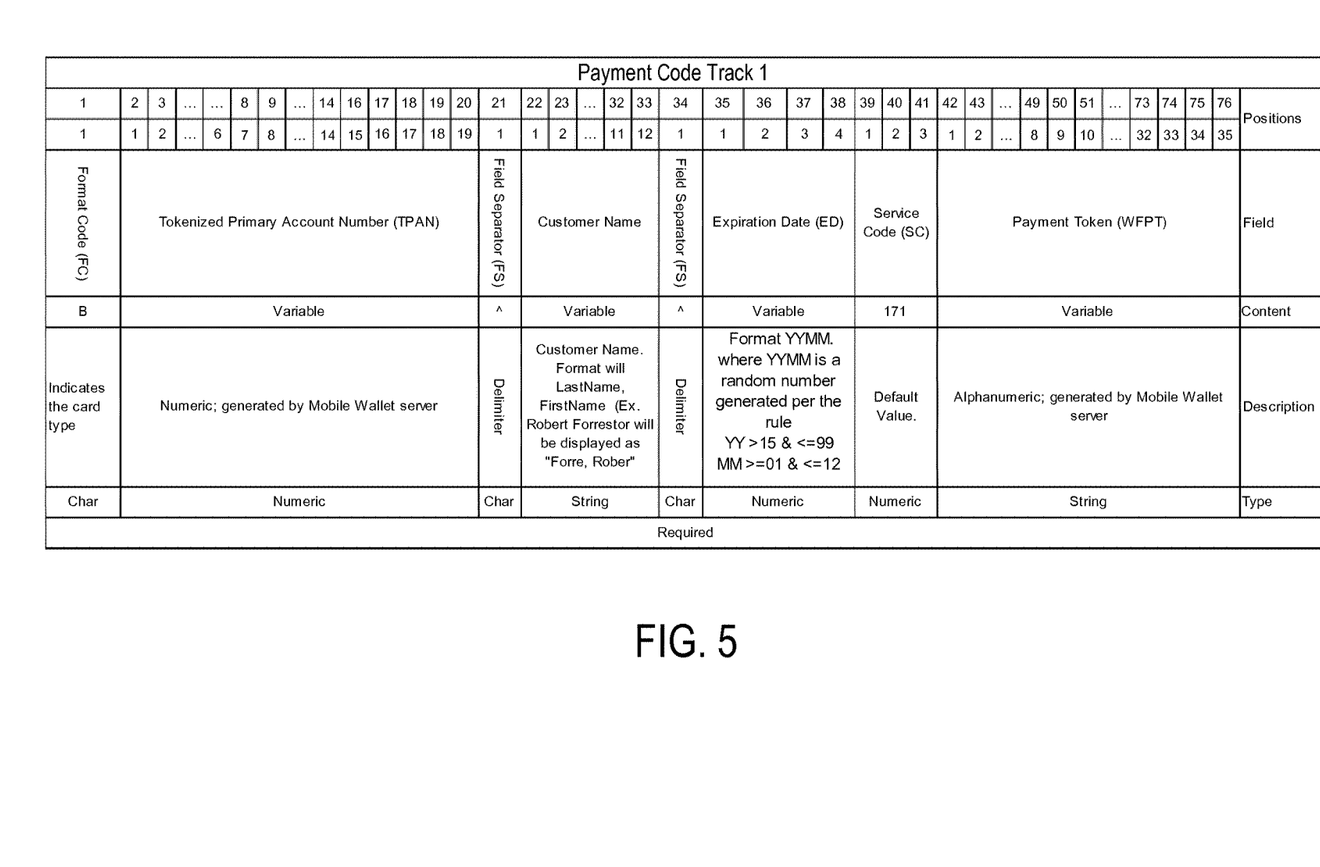
FIG. 5 illustrates a Track 1 format for a generated QR code that may be created in the token generation process, according to an example embodiment.
Figure 6:
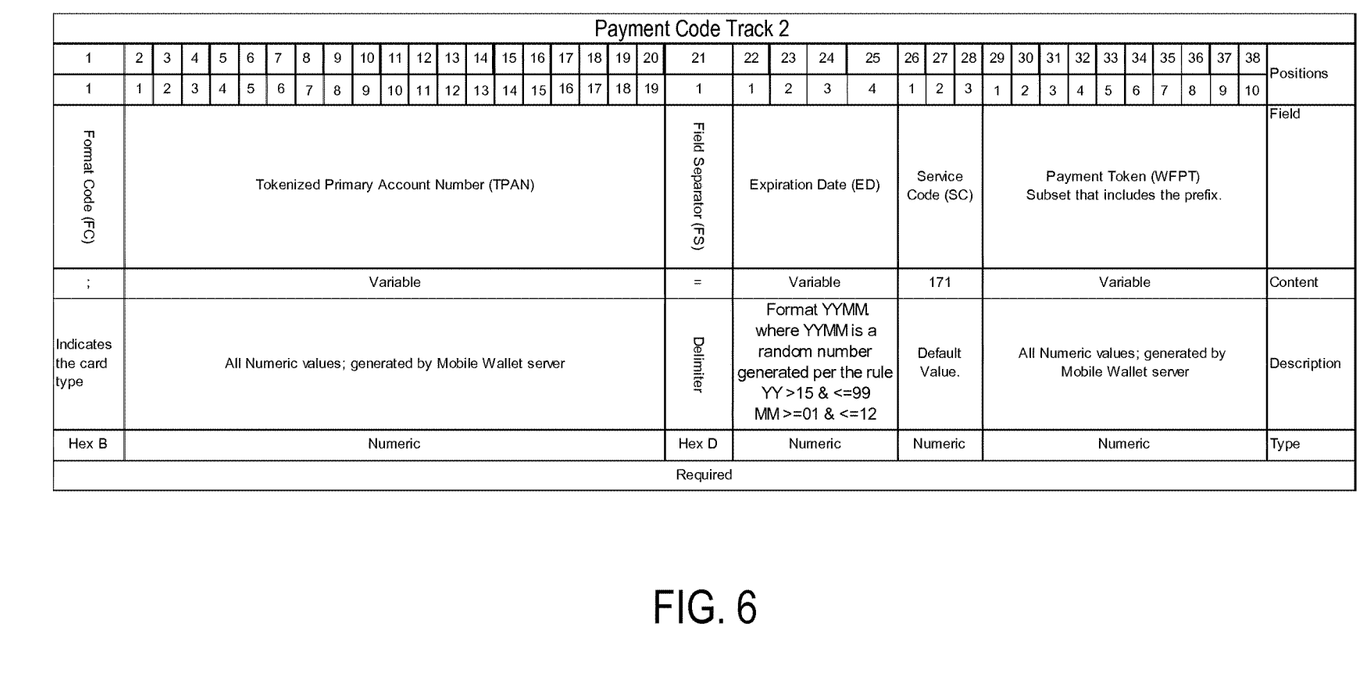
FIG. 6 illustrates a Track 2 format for a generated QR code that may be created in the token generation process, according to an example embodiment.

Referring to FIGS. 5-6, codes that may be sent during operation of the system 100 are shown. As previously indicated, information embedded in the codes may be embedded in a Track 1 format and Track 2. The code may be sent optically as a code or in another manner. As will be appreciated, the code formats shown in FIGS. 5-6 are example code formats that may be used with the systems and methods described herein. In other embodiments, other formats may be used.

The Track 1 format in FIG. 5 is shown to include 76 digits and the Track 2 format in FIG. 6 is shown to include 38 digits. Each format may generally include a format code (digit 1), tokenized primary account number 501 (digits 2-20), a field separator (digit 21), an expiration date 505 (digits 35-38 in Track 1, digits 22-25 in Track 2), a service code (digits 39-41 or 26-28), and a payment token 507 (digits 42-76 or 29-38). Each track may additionally or alternatively include other fields representing different data to be embedded in the code. In one embodiment (the Track 1 format), the credit card data may include a customer name or other customer identifier (e.g., in digits 22-33 of the Track 1 format).

Figure 8:
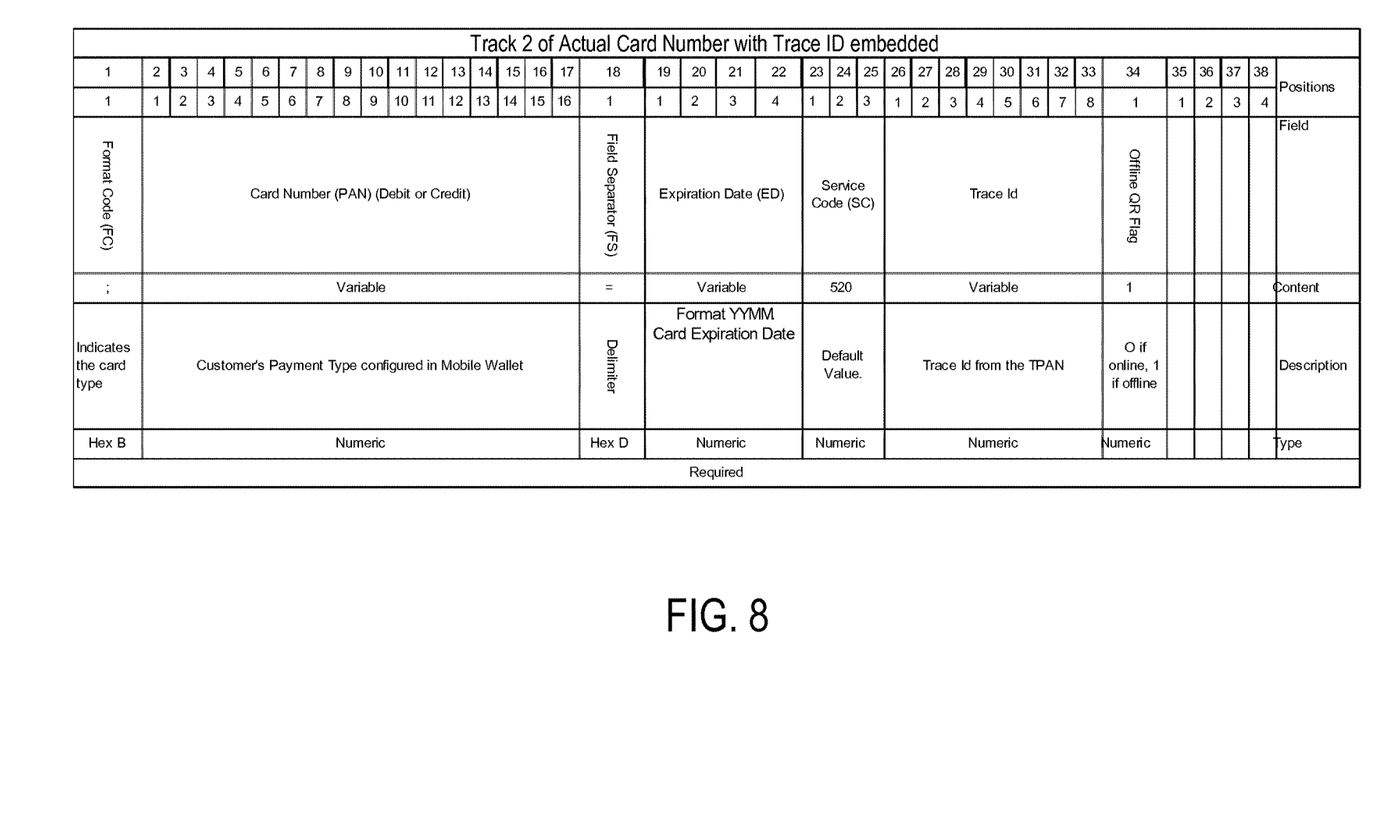
FIG. 8 illustrates a Track 2 format for a code generated, according to an example embodiment.

In various embodiments of the present disclosure, account information associated with the user's mobile wallet account may be represented in the code using digits 2 through 20 of the Track 1 or Track 2 format. This is shown in FIGS. 5-6 as the tokenized primary account number (TPAN). Referring also to FIG. 8, the TPAN format is shown in greater detail.

Figure 7:
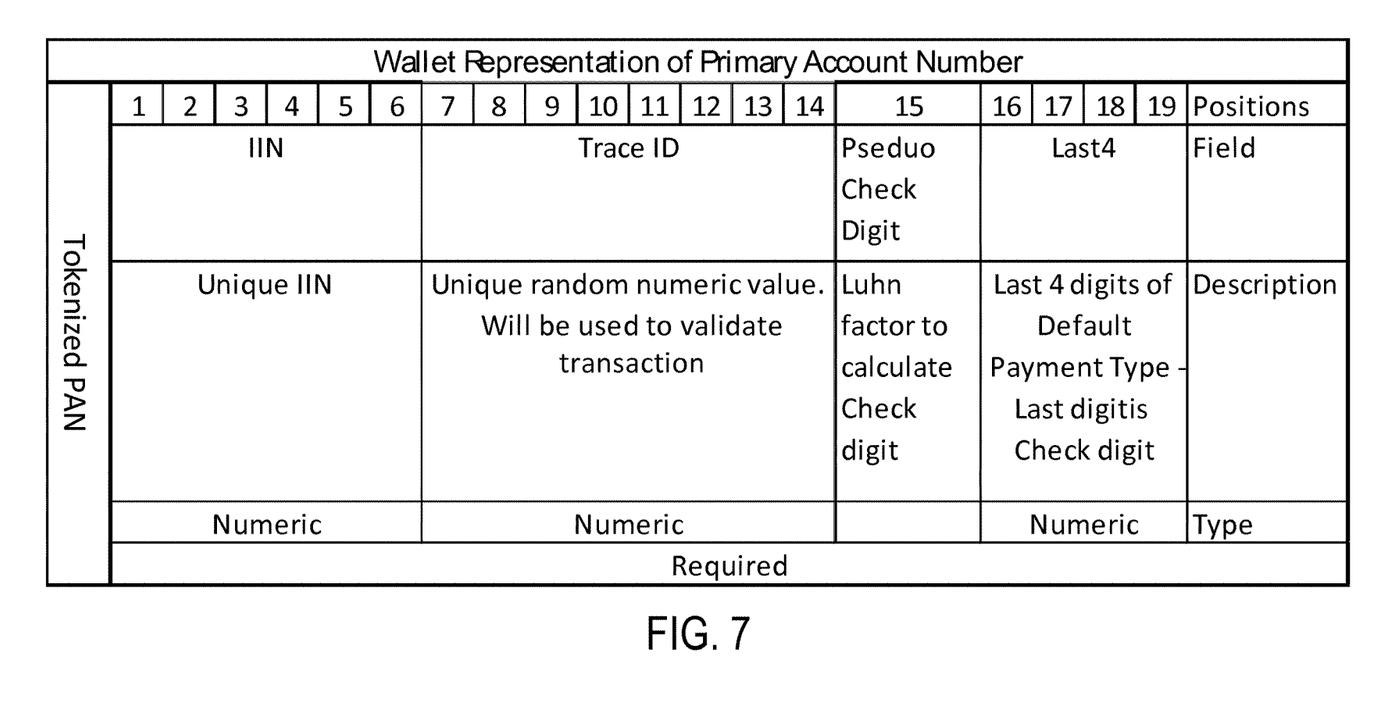
FIG. 7 illustrates a tokenized primary account number (TPAN) format within the QR code of FIGS. 5-6, according to an example embodiment.

As shown in FIG. 7, the first six digits of the TPAN may represent an issuer identification number (IIN) that is used to route the TPAN to the appropriate mobile wallet bank computer system 120. The IIN is a predetermined number issued to each bank for financial institution for routing fund transfer requests. In the present configuration, an IIN that is associated with the bank that operates the mobile wallet computer system 120 may be used.

Digits 7 through 15 of the TPAN may represent a Trace ID, and digits 16 through 19 may represent account information (e.g., the last four digits of an actual account number, or other account information). First generating random numbers for digits 7 through 14 may create the Trace ID. The Trace ID may be used for verifying and approving a user initiated transaction. Once those digits are determined, then digit 15 may be calculated. Digit 15 is calculated such that digit 19 may be used as the checksum digit of the tokenized card number or the code. In other words, even though digit 19 is fixed (as part of the actual card number of the account), digit 19 may be used as the checksum digit, because digit 15 is calculated in such a way to allow the code to pass the error detection process. Digits 1-19 from FIG. 7 map to digits 2-20 in FIGS. 5 and 6. For example, digits 2-20 of FIGS. 5 and 6 may include the IIN, Trace ID, pseudo check digit, last 4 digits of the card number as shown in FIG. 7.

The checksum digit is used for error detection purposes (e.g., to detect errors in manually inputted data that is included in the code). For example, the checksum digit is used to help detect single digit errors, errors where digits are transposed, twin errors, etc. The checksum digit may then be used in one of several algorithms for checking for errors in the code. It should be appreciated that one of any type of checksum algorithm may be used with the embodiment described herein.

In other embodiments, a digit other than digit 15 may be used as the calculated digit. For example, any eight of the nine digits between digit 7 and 15 may be randomized, and the remaining digit may be used as the "checksum helper" digit (e.g., the digit calculated to make digit 19 the checksum digit).

Referring also to FIG. 8, actual card number is sent in Track 2 format that may be generated at step 810 is shown in greater detail. As compared to the QR code of FIGS. 5-7, the trace ID is moved to digits 26-33, and the actual account number may be provided as digits 2 through 17. In other words, a subset of the original token generated by the mobile wallet bank computer system is moved into a discretionary field of the new generated token. The code is shown to generally include the trace ID and account number, along with an expiration date field (e.g., with the same digits as determined in an earlier process of creating the original token) and a service code field. The code may optionally include any other type of information.

In various embodiments, using the trace ID may allow the financial institution to identify mobile wallet transactions. Upon identifying the mobile wallet transactions, the financial institution may segment the mobile wallet transactions for risk, customer service, security, and card not present transactions. In other embodiments, the transactions that were performed using mobile wallet bank computer system 120 each use a trace identification number and the user may be charged a different fee for such transactions. In various embodiments, when a user of a mobile wallet account loses their credit card or debit card and the financial institution issues the user a new credit card or debit card, the mobile wallet may be able to auto provision the newly issued cards. Auto provisioning may allow the user to use the mobile wallet account prior to receiving and/or activating the credit or debit card. In other embodiments, in the case of mobile wallet fraud, the mobile wallet account of the user may be reset.

A credit card may be used to pay for a transaction at a point of sale location using the physical credit card, known as a credit card present transaction. A credit card may be used when a credit card is not physically located at a merchant location, such as but not limited to, an online merchant transaction where the credit card information is entered in an online transaction. A financial institution may rank the risk of fraud for each type of transaction. In some embodiments, the financial institution may assign a higher risk rating to a credit card that is not present at the merchant location than a credit card present transaction. In various embodiments, a mobile wallet that performs a transaction at a merchant location may be considered more secure than a physical credit card because the mobile wallet does not provide the merchant the actual credit card number and the mobile wallet does not have the actual credit card number. Accordingly, the financial institution may determine that a transaction was a mobile wallet transaction based on the trace ID and rate the transaction to be more secure or fraud resistant than card present transaction. The financial institution may create a new risk rating that is of a lower risk for mobile wallet transactions. In some embodiments, the transactions that are performed using a mobile wallet may be charged different fee because of the risk rating. In various embodiments, due to the reduction of risk the mobile wallet transactions may be charged a lower fee than card present or card not present transactions.

Figure 9:
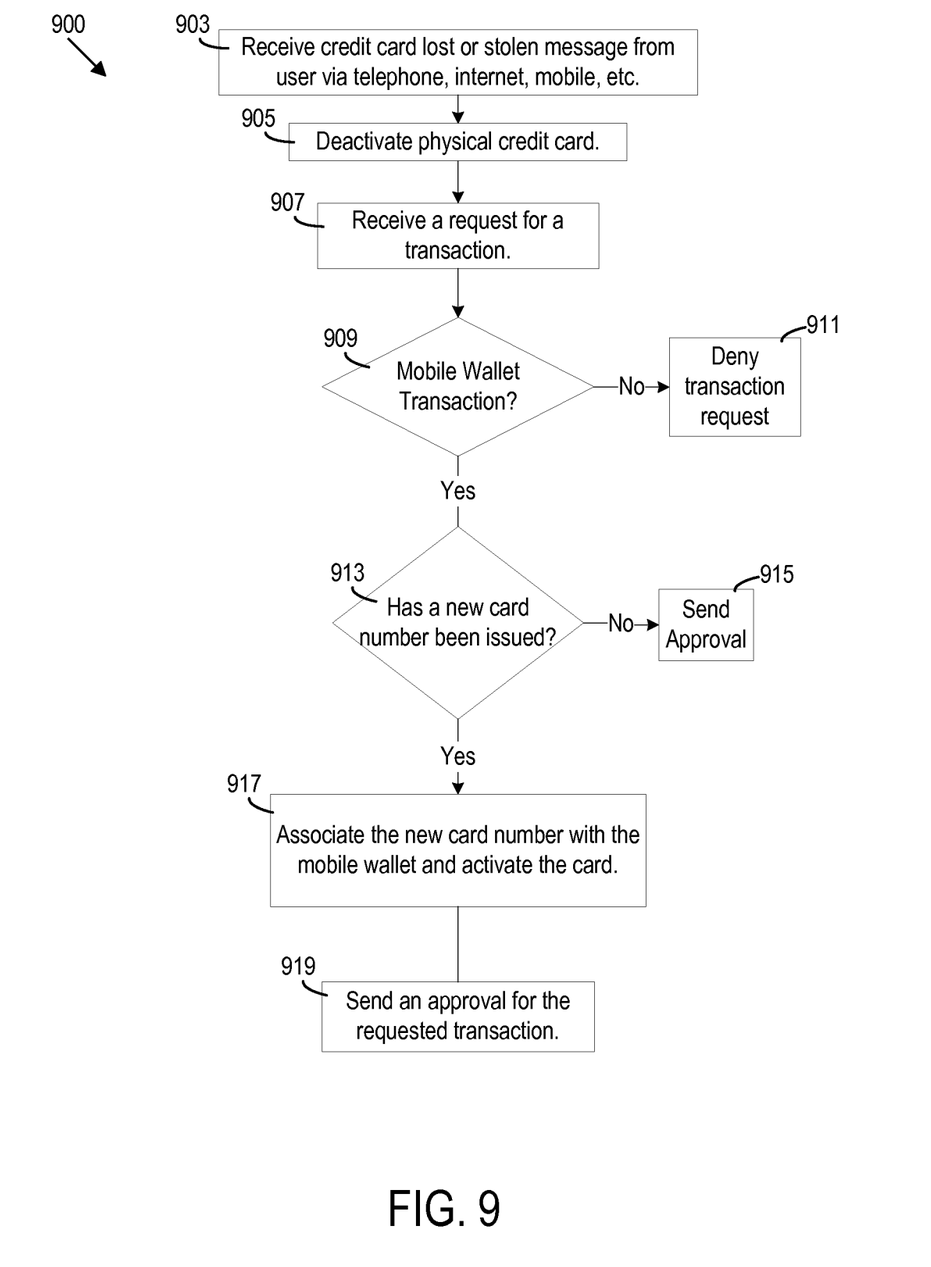
FIG. 9 illustrates a process that may be implemented by the system in FIG. 1 according to an example embodiment.

FIG. 9 illustrates a process 900 that may be implemented by the system in FIG. 1. In various embodiments, process 900 may be used when an account holder reports their physical card lost or stolen via telephone, Internet, mobile device, etc. In some embodiments, process 900 may allow the account holder to perform one or more transactions using the mobile wallet stored on a mobile device, even after the physical card has been lost or stolen. Some advantages of process 900 may include the account retaining the use of the account even after the loss of a physical card. Additional advantages may include the account holder being able to activate the newly issued replacement card by using the mobile wallet functionality.

At step 903, the financial institution computer system may receive a message from the user that the physical card is lost or stolen. In various embodiments, the account holder may contact the financial institution computer system using various communication methods, such as but not limited to, telephone, Internet, and mobile device. Upon receiving the message from the account holder that the physical card is lost or stolen, the financial institution computer system may ask the account holder whether the mobile wallet account has also been compromised. After receiving input from the account holder that the mobile wallet account holder has not been compromised, the financial institution computer system may deactivate the physical card account, at step 905. In some embodiments, the financial institution computer system may assign the uncompromised mobile wallet account to a temporary account to allow the account holder to conduct transactions using the mobile wallet.

In various embodiments, the financial institution computer system may receive a request for a transaction from a merchant, at step 907. At step 909, the financial institution computer system determines whether the transaction is being performed by a mobile wallet or whether the transaction is being performed by the physical card information. Since the mobile wallet transaction is performed using at least a trace ID, the financial institution computer system may differentiate between the mobile wallet transaction and the physical card information transaction.

Upon determining that the transaction request is not from a mobile wallet or is using the actual card information, the financial institution computer system may deny the transaction request, at step 911. The financial institution computer system would be able to avoid any fraudulent transactions using the actual card information by denying the transaction request that did not originate from a mobile wallet associated with the account.

When the financial institution computer system determines that the transaction request originated from a mobile wallet account, the financial institution may determine whether a new replacement card number has been issued to the account holder at step 913. If a new replacement card number has not been issued, the financial institution may approve the transaction at step 915 based on the determination that the transaction is a mobile wallet transaction and based on the fact that the mobile wallet account has not been compromised. In some embodiments, the transaction may be approved using the temporary card number discussed above.

In various embodiments, when the financial institution has issued a new card, but account holder has not activated the physical card because the account holder has not received the card or other reasons, the financial institution may update its records with respect to the mobile wallet. For example, at step 917, the financial institution computer system may update its records to associate the new card number with the mobile wallet account of the previous card number at step 917. After step 917, the financial institution may send an approval for the transaction request at step 919. In other embodiments, the mobile wallet client application on the mobile device 110 may prompt the user to activate the card prior to the user having received the physical card. In other embodiments, even after receiving the card the account holder may wish to activate the card via the mobile wallet application. Activating the card by the account holder, may update the financial institution settings to associate the new card number with the mobile wallet account number.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A computer-implemented method performed by one or more processors of a mobile wallet computer system, comprising:
   receiving, by network interface logic of the mobile wallet computer system, a fund access request from a mobile device of a user having a mobile wallet account provided by the mobile wallet computer system;
   based on the fund access request, generating, by a token generator of the mobile wallet computer system, a payment token unique to a payment transaction and a tokenized card number, and wherein generating the tokenized card number comprises:
   replacing an issuer identifier of an actual card number of the user with an issuer identifier number that belongs to a financial institution providing the mobile wallet computer system;
   generating a plurality of generated numbers and replacing an equivalent number of digits in the actual card number with the plurality of generated numbers, wherein the plurality of generated numbers do not match the digits in the actual card number, and wherein the plurality of generated numbers includes a trace identification number based on the mobile wallet account of the user; and
   retaining at least the last four digits of the actual card number;
   sending, by the network interface logic of the mobile wallet computer system, a code in track 1 or track 2 format to the mobile device, wherein the code includes the tokenized card number embedded within a primary account number field and the payment token embedded within an issuer discretionary field;
   receiving, by the network interface logic of the mobile wallet computer system, a code in track 1 or track 2 format from an acquirer processor computer system, wherein the received code is one of the same or different than the code sent to the mobile device, and wherein the received code includes the tokenized card number embedded within a primary account number field and the payment token embedded within an issuer discretionary field;
   determining, by account processing logic of the mobile wallet computer system, the actual card number based on the received code, including retrieving the trace identification number stored within the tokenized card number and determining the actual card number associated with both the trace identification number and the payment token;
   verifying, by transaction verification logic of the mobile wallet computer system, the tokenized card number based on the generated numbers of the tokenized card number, including the trace identification number; and
   sending, by the network interface logic of the mobile wallet computer system, the actual card number and the trace identification number to the acquirer processor computer system in track 1 or track 2 format by replacing the tokenized card number stored within the primary account number field with the actual card number, replacing the payment token stored within the issuer discretionary field with the trace identification number, and sending a value of the primary account number field and the issuer discretionary field to the acquirer processor computer system.

2. The method of claim 1, wherein the tokenized card number is generated to include a checksum digit within the last four digits of the actual card number, wherein generating the plurality of generated numbers further comprises generating a single checksum helper digit, and wherein the combination of the new issuer identifier number, the trace identification number, and the single checksum helper digit result in a checksum that is equal to the checksum digit.

3. The method of claim 1, wherein the fund access request includes a device identification number for the mobile device, and wherein the method further comprises:

authenticating, by the account processing logic of the mobile wallet computer system, the user based on the device identification number received from the mobile device, including matching the device identification number with account information stored in an accounts database of the mobile wallet computer system.

4. The method of claim 1, wherein the trace identification number is unique to the mobile wallet account of the user.

5. A computer-implemented method performed by one or more processors of a mobile wallet computer system, comprising:

receiving, by network interface logic of the mobile wallet computer system, a fund access request from a mobile device of a user having a mobile wallet account provided by the mobile wallet computer system;

based on the fund access request, generating, by a token generator of the mobile wallet computer system, a payment token unique to a payment transaction and a tokenized card number, and wherein generating the tokenized card number comprises:

replacing an issuer identifier of an actual card number of the user with an issuer identifier number that belongs to a financial institution providing the mobile wallet computer system;

generating a plurality of generated numbers and replacing an equivalent number of digits in the actual card number with the plurality of generated numbers, wherein the plurality of generated numbers do not match the digits in the actual card number, and wherein the plurality of generated numbers includes a trace identification number based on the mobile wallet account of the user; and     retaining at least the last four digits of the actual card number;

sending, by the network interface logic of the mobile wallet computer system, a code in track 1 or track 2 format to the mobile device, wherein the code includes the tokenized card number embedded within a primary account number field and the payment token embedded within an issuer discretionary field;

receiving, by the network interface logic of the mobile wallet computer system, a code in track 1 or track 2 format from an acquirer processor computer system, wherein the received code is one of the same or different than the code sent to the mobile device, and wherein the received code includes the tokenized card number embedded within a primary account number field and the payment token embedded within an issuer discretionary field;

determining, by transaction verification logic of the mobile wallet computer system, the actual card number based on the received code, including retrieving the trace identification number stored within the tokenized card number and determining the actual card number associated with both the trace identification number and the payment token; and     sending, by the network interface logic of the mobile wallet computer system, the actual card number and the trace identification number to the acquirer processor computer system in track 1 or track 2 format by replacing the tokenized card number stored within the primary account number field with the actual card number, replacing the payment token stored within the issuer discretionary field with the trace identification number, and sending a value of the primary account number field and the issuer discretionary field to the acquirer processor computer system.

6. The method of claim 5, wherein the tokenized card number is generated to include a checksum digit within the last four digits of the actual card number, wherein generating the plurality of generated numbers further comprises generating a single checksum helper digit, and wherein the combination of the new issuer identifier number, the trace identification number, and the single checksum helper digit result in a checksum that is equal to the checksum digit.

7. The method of claim 5, wherein the tokenized card number is generated to include exactly 19 digits.

* * * * *